United States Patent
Ashida et al.

(10) Patent No.: US 8,681,923 B2
(45) Date of Patent: Mar. 25, 2014

(54) METHOD OF MANUFACTURING CORE SHROUD FOR NUCLEAR POWER PLANT AND STRUCTURE OF NUCLEAR POWER PLANT

(75) Inventors: Eiji Ashida, Hitachiota (JP); Xudong Zhang, Hitachinaka (JP); Shoh Tarasawa, Hitachinaka (JP); Masaya Okada, Hitachi (JP); Yusuke Anma, Matsue (JP)

(73) Assignee: Hitachi, Ltd., Tokyo (JP)

( * ) Notice: Subject to any disclaimer, the term of this patent is extended or adjusted under 35 U.S.C. 154(b) by 673 days.

(21) Appl. No.: 12/646,519

(22) Filed: Dec. 23, 2009

(65) Prior Publication Data

US 2010/0183112 A1 Jul. 22, 2010

(30) Foreign Application Priority Data

Dec. 26, 2008 (JP) ................. 2008-331832

(51) Int. Cl.
| | |
|---|---|
| *B23K 26/20* | (2006.01) |
| *B23K 26/12* | (2006.01) |
| *G21C 21/00* | (2006.01) |
| *G21C 5/02* | (2006.01) |
| *G21C 11/00* | (2006.01) |
| *B23K 26/00* | (2006.01) |
| *G21C 5/00* | (2006.01) |

(52) U.S. Cl.
USPC .......... 376/287; 376/277; 376/463; 52/741.1; 52/745.19; 219/50; 219/121.11; 219/121.6; 219/121.63; 219/121.64

(58) Field of Classification Search
USPC .......... 376/260, 277, 287–296, 462, 463; 52/741.1, 741.3, 745.02–745.04, 52/745.19–745.2, 747.1, 748.1, 748.11, 52/750; 219/50, 121.11, 136, 137 R, 76.1, 219/121.6, 121.63, 121.64
See application file for complete search history.

(56) References Cited

U.S. PATENT DOCUMENTS

| | | | | |
|---|---|---|---|---|
| 3,610,876 A | * | 10/1971 | Bhat ...................... | 219/137 R |
| 3,679,866 A | * | 7/1972 | Arikawa et al. ......... | 219/137 R |

(Continued)

FOREIGN PATENT DOCUMENTS

| | | | | |
|---|---|---|---|---|
| JP | 58-151988 | | 9/1983 | |
| JP | 59-77385 A | * | 5/1984 | ............. G21C 13/00 |

(Continued)

OTHER PUBLICATIONS

Japanese Office Action, and partial English translation thereof, issued in Japanese Patent Application No. 2008-331832 mailed Oct. 2, 2012.

*Primary Examiner* — Bernarr Gregory (74) *Attorney, Agent, or Firm* — McDermott Will & Emery LLP (57) ABSTRACT

The present invention provides a method of manufacturing a core shroud for a nuclear plant and a nuclear power plant structure in which a groove portion is easily assembled in the case of manufacturing the core shroud having a weld structure of a nuclear power plant by a laser welding, and it is possible to obtain a weld joint portion in which a plastic distortion region and a residual stress are as small as possible, going with a solidification shrinkage of the weld portion. At a time of welding butted portions of a plurality of members constructing a core shroud, a root face is provided in the butted portion, a length of the root face is set to 25% to 95% of a thickness of the thinner one of the butted portions of a plurality of members, a narrow groove is provided in the other than the root face, and the butted portions are welded by a laser welding using a weld wire.

4 Claims, 6 Drawing Sheets

(56) References Cited

U.S. PATENT DOCUMENTS

| | | | | |
|---|---|---|---|---|
| 4,230,255 | A | * | 10/1980 | Coulter ........................ 52/747.1 |
| 4,627,213 | A | * | 12/1986 | Magnin ...................... 52/745.02 |
| 5,201,161 | A | * | 4/1993 | Kamei ....................... 52/745.02 |
| 5,530,219 | A | * | 6/1996 | Offer et al. ................ 219/137 R |
| 5,760,365 | A | | 6/1998 | Milewski et al. |
| 2006/0201915 | A1 | * | 9/2006 | Obana et al. ................. 219/76.1 |

FOREIGN PATENT DOCUMENTS

| | | | | | |
|---|---|---|---|---|---|
| JP | 59-162483 | A | * | 9/1984 | ............ G21C 13/00 |
| JP | 60-14197 | A | * | 1/1985 | ............ G21C 13/00 |
| JP | 60-60588 | A | * | 4/1985 | ............ G21C 13/00 |
| JP | 60-104289 | A | * | 6/1985 | ............ G21C 13/00 |
| JP | 61-017389 | A | | 1/1986 | |
| JP | 3-176537 | A | * | 7/1991 | ............... E04B 5/00 |
| JP | 8-233971 | A | * | 9/1996 | ............ G21C 13/00 |
| JP | 09-201687 | | | 8/1997 | |
| JP | 10-216942 | A | | 8/1998 | |
| JP | 10-328860 | A | | 12/1998 | |
| JP | 2007-021516 | | | 2/2007 | |
| JP | 2007-190568 | | | 8/2007 | |
| JP | 2008-284588 | A | | 11/2008 | |

* cited by examiner

METHOD OF MANUFACTURING CORE SHROUD FOR NUCLEAR POWER PLANT AND STRUCTURE OF NUCLEAR POWER PLANT

TECHNICAL FIELD

The present invention relates to a method of manufacturing a core shroud for a nuclear power plant, and more particularly to a method of manufacturing a core shroud for a nuclear power plant having a welding structure which is preferable for being manufactured by a laser welding, and a structure of a nuclear power plant.

BACKGROUND ART

In the nuclear power plant, a high-temperature and high-pressure water is used, and a high reliability is demanded. Accordingly, in order to prevent an aged deterioration phenomenon, particularly a stress corrosion crack, the nuclear power plant is manufactured by a method which suppresses a generation of a residual stress due to a working strain or a tensile stress likely causing the stress corrosion crack.

Patent document 1 discloses a method of setting a residual stress close to a backside of groove bottom surface to a compression stress or a small tensile stress, by a narrow groove welding method for a nuclear structure with a root face. Particularly, it relates to the narrow groove welding method and the welding structure with the root face, and a welding apparatus thereof, and the patent document 1 discloses a method of improving a residual stress of a groove bottom surface to a compression, characterized by employing an arc welding method as a welding method, and is provided with a first layer welding step of forming a weld bead in a backside surface of the groove bottom portion, a step of deposition welding in a first heat input range to a specific deposited bead height after the first layer welding step, and a step of welding a remaining portion by a second heat input range.

Patent document 2 relates to a method of welding a extreme thick plate for a nuclear plant, and discloses a joint shape having a root face welded by a low heat input and a remaining groove portion deposition welded by an conventional arc welding. Particularly, it describes a method of welding an extreme thick steel with a possible lower range of heat input and a remaining portion is welded by an arc welding.

Patent documents 3 and 4 disclose a welding method of deposition welding a narrow groove by using a laser welding and a welding groove shape. The patent document 3 discloses a narrow groove laser welding method of setting a welded portion to a narrow groove width, irradiating a laser beam into the narrow groove while feeding a filler wire, melting the filler wire by the laser beam, and deposition build-up welding.

The patent document 4 discloses a welding method of setting a narrow groove in butted portions of weld subject members and setting a curvature to a bottom portion of the groove, setting a root face of 1 mm to 5 mm to the butted portions, and setting a ratio of a depth of weld penetration with respect to a width of weld to a predetermined range (which is equal to or more than 1 and equal to or less than 1.4), as a method of welding metals to each other by using a laser beam and a method of manufacturing a liquefied gas tank.

Patent Document 1: JP-A-2007-21516
Patent Document 2: JP-A-58-151988
Patent Document 3: JP-A-9-201687
Patent Document 4: JP-A-2007-190568

DISCLOSURE OF THE INVENTION

Problem to be Solved by the Invention

The patent document 1 is effective for improving the residual stress in a backside surface of the groove bottom portion to the compression on the basis of the one side welding, however, since the root face of the groove butted surface is small and between about 1 and 2.5 mm, it is necessary to carry out a weld groove assembling work while holding a structure by using a lot of welding jigs, stands and the like at a time of assembling a thick and large-scaled weld structure such as a core shroud, and a great amount of labor is necessary. Further, in the assembling work mentioned above, a damage causing a generation of the stress corrosion crack tends to be applied to the structure. Further, it is necessary to weld by a low heat input for suppressing a transition of the residual stress in the backside of surface to a tension side because of the upper deposition welds, the welding efficiency is low.

The welding method of the patent document 2 mentioned above is effective for lowering a welding contraction in the welding of the extreme thick plate, however, since the remaining portion is welded by the conventional arc welding, an effect of lowering the welding contraction of the groove is small in the case that the much remaining portion is welded. As a result, there is a possibility that the effect of lowering the residual stress of the weld portion is not sufficient.

The patent documents 3 and 4 are the effective methods for achieving a welding efficiency, however, since the groove shape is not taken into consideration for the assembling work of the groove portion in the case of manufacturing the large-scaled structure such as the core shroud of the power plant, as same as that described in the patent document 1, a great amount of labor is necessary for the assembling work of the welding work, and the damage causing the generation of the stress corrosion crack tends to be applied to the structure. Further, since the depth of the welding groove is large by laser welding with feeding the filler wire, a high tensile residual stress is generated in the weld portion.

The present invention is made by taking the above into consideration, and an object of the present invention is to provide a method of manufacturing a core shroud of a nuclear power plant and a nuclear power plant structure in which an assembly of a groove portion is easy in the case of manufacturing the core shroud having a weld structure in accordance with a laser welding, and a welded joint can be obtained such that a plastic distortion region and a residual stress going with a solidification shrinkage is as small as possible.

Means for Solving the Problem

The present invention for achieving the object mentioned above is a method of manufacturing a core shroud for a nuclear plant, in which the laser welding is carried out by using a narrow groove provided with a partial root face at least, in the case of welding a butt joint, or a narrow groove having a partial root face is formed for butting a plurality of members, the root face is fully penetration welded by a laser beam from one side or both side of the butted portions, and the remaining narrow groove portion is thereafter deposition welded. In the welding of the root face, an elongated deep penetration bead is formed. In the deposition welding of the remaining narrow groove, a welding wire is used. A welding strain is reduced by widening a range of the root face so as to assembly the large-scale structure easily.

Particularly, a method of manufacturing a core shroud for a nuclear plant in accordance with the present invention is characterized in that the root face is provided in the butted portion at a time of welding the butted portions of a plurality of members constructing the core shroud for the nuclear plant, a length of the root face is set to 25% to 95% of a thickness of the thinner one of the butted portions of the metal members, a narrow groove is provided besides the root face, and the butted portions are welded by a laser welding using a welding wire.

The groove is the narrow groove with a width of a bottom portion is between 1 mm and 4 mm, and an angle of the groove is between 1 degree and 7 degree. Since a curvature is provided at an end portion of the groove bottom portion, the width of the groove bottom portion can be specified by intersecting points of an extension line of both side surfaces of the groove and an extension line of the groove bottom portion. The root face is provided with a step or a concavity and convexity for accurately assembling a plurality of metal members.

A shielding gas protecting the melting portion and the vicinity thereof is used at a time of welding. A nitrogen gas is preferable as the shielding gas. In the case of using the nitrogen gas, an austenitic stainless steel wire including 14% to 20% ferrite content calculated from a wire component is used as a welding wire. Particularly, it is preferable to use the wire mentioned above in the deposition welded portions which contact with a cooling water in a nuclear reactor.

Effect of the Invention

In accordance with the method of manufacturing the core shroud on the basis of the present invention, since it is possible to easily assemble and accurately form the weld groove of the butted portion constructed by combining a plurality of members, it is possible to shorten a manufacturing time, and it is possible to reduce a damage applied to a core surface as much as possible which tends to be generated at a time of assembling, so that the present invention is effective for manufacturing the nuclear power plant.

Other objects, features and advantages of the invention will become apparent from the following description of the embodiments of the invention taken in conjunction with the accompanying drawings.

BEST MODE FOR CARRYING OUT THE INVENTION

As mentioned above, since the high-temperature and high-pressure water is used in the nuclear power plant, the austenitic stainless steel having an excellent corrosion resistance is used in a main equipment. Further, since the nuclear plant main equipment is used under a high-temperature and high-pressure environment, there is fear that an aged deterioration phenomenon such as a stress corrosion crack or the like is generated.

It is thought that the stress corrosion crack is generated on the basis of a superposition of three factors of a material factor, a stress factor and an environment factor. Accordingly, at a time of manufacturing the nuclear plant structure, it is necessary to remove the stress factor as much as possible and pay attention to a tensile stress and a working strain causing the generation of the stress corrosion crack so that the tensile stress and the working strain do not remain in the surface and the bonded portion of the structure as much as possible. The tensile stress and the working strain are generated in the case that the stress is applied by an external force at a time of machining and at a time of assembling and a hardening and a distortion are generated, and are generated by the stress or the like generated during solidification process of the melted metal. Accordingly, after the machining, a work for grinding the surface and removing an affected layer by the machining is carried out.

Further, the work for assembling and welding is carried out by using the welding jig, the stand and the like and constraining the members while paying best attention so that the damage is not applied to the constructing members, however, a great much labor is necessary, it is easy to form the welding groove, and a welding groove shape and a welding procedure are desirable by which a weld portion having a low residual stress can be obtained.

Figure 1:
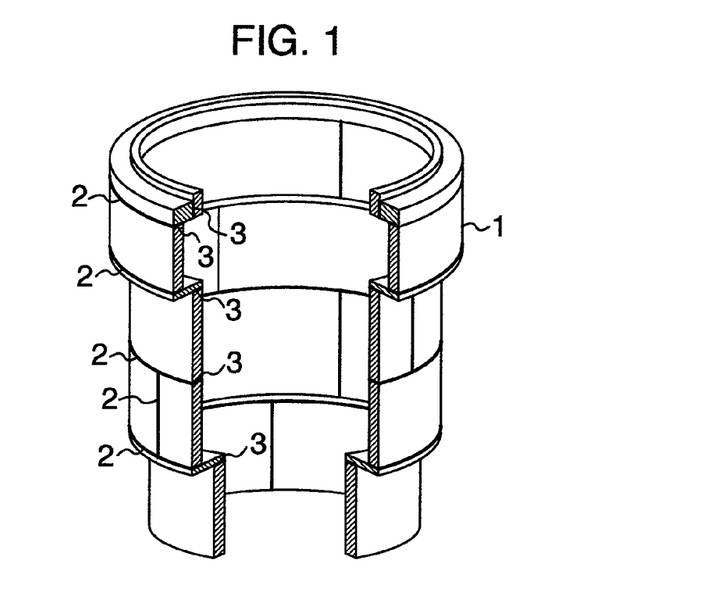
FIG. 1 is an outline schematic view of a core shroud.

The core shroud corresponding to the main equipment of the nuclear power plant structure is a cylindrical structure as shown in FIG. 1, and is manufactured by joining members 1 with a thickness equal to or more than 30 mm and manufactured by casting or forging by welding portions of butt welding lines 2. The welding is carried out in accordance with a method of forming a V-shaped groove or a groove called as "narrow groove" in the joint portion and filling the groove portion in accordance with a multilayer buildup welding by means of an arc welding.

Figure 2:
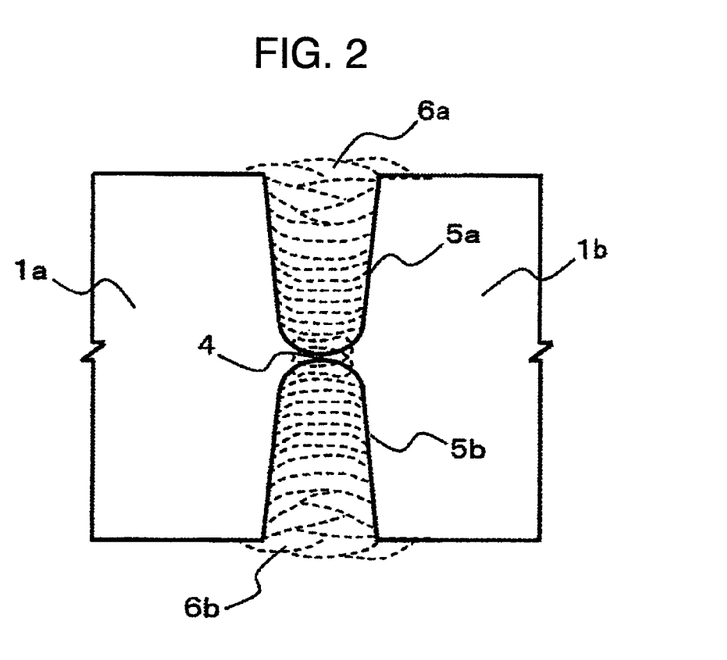
FIG. 2 is a cross sectional view of an example of a welding groove in accordance with a conventional method.

FIG. 2 shows a conventional example. A butted surface called as a root face 4 for aligning the welded members 1 is formed in the groove, and a groove wall portion 5 is filled with a weld metal 6 in accordance with the buildup multilayer welding after completely melting the root face by means of the arc. The root face is formed in a range between 1 mm and 2.5 mm in such a manner as to easily melt completely, and a width between 5 mm and 10 mm is used in the width of the bottom portion of the groove 5 of the narrow groove.

On the other hand, a method of manufacturing the core shroud for the nuclear plant in accordance with the present invention is characterized by changing the shape of the butted shape in accordance with the conventional example mentioned above and welding in accordance with a laser welding. Specifically, at a time of welding the butted portions of a plurality of members constructing the core shroud for the nuclear plant, a root face is provided in the butted portions, a narrow groove is provided in the other portion, a length of the root face is set to 25% to 95% of a thickness of the thinner one of the butted portions of the metal members, and the butted portions are welded by a laser welding using a welding wire. The narrow groove has a curvature in an end portion of the groove bottom portion, and is structured such that a width of the groove bottom portion constructed by intersecting points of an extension line of both side surfaces of the groove and an extension line of the groove bottom portion is between 1 mm and 4 mm, and an angle of the groove formed by both side surfaces of the groove is between 1 degree and 7 degree. Since the nuclear power plant structure requires a high reliability, an accurate working and assembling is demanded. A step, a concavity and convexity or the like for accurately assembling a plurality of members with each other may be formed in the root face provided in the butted portions.

The welding groove can be easily assembled, and a lot of constraining jigs and stands are not necessary, by setting the length of the root face of the weld groove in the butted portions of a plurality of members constructing the core shroud to 25% to 95% of the thickness of the thinner one of the butted portions of the metal members, a working time can be shortened, and it is possible to reduce a work addition in which there is fear that the core is damaged at a time of the assembling and welding. Further, it becomes easy to form an alignment reference such as the step, the concavity and convexity or the like for accurately aligning a plurality of members in the root face, and an assembling precision of the members is improved. It is necessary to weld the root face from one side or both sides so as to completely melt the butted portions, the root face can be completely penetration welded from one side or both sides by using a laser welding having a high energy density and forming an elongated and deep penetration bead.

The welding has a step of butting the root faces and forming the weld groove by using the step, the concavity and convexity or the like formed in the root face as the alignment reference, a step of completely penetration welding the root face from one side and both sides, and a step of thereafter deposition welding the narrow groove portion while adding the austenitic stainless steel welding wire. The weld portion welded as mentioned above has an elongated and deep penetration bead portion (a first weld metal portion) which is welded in the portion between 25% and 95% of the thickness from one side or both sides by using the laser welding, and a portion (a second weld metal portion) which is deposition welded by using the welding wire.

Particularly, in the method of manufacturing the core shroud for the nuclear power plant in accordance with the present invention, it is preferable to use the nitrogen gas for the shield gas protecting the melting portion and the vicinity thereof and use the austenitic stainless steel wire including 14% to 20% ferrite content calculated from the wire component, in the laser welding using the welding wire. Further, in the first and second weld metal portions of the weld structure in accordance with the present invention, 500 to 1000 ppm nitrogen in mass percent is included in the weld.

Even if the length of the root face of the butted portions is 100%, it is possible to weld by using a high-power laser welding machine, however, in the case of laser welding the austenitic stainless steel corresponding to the constructing material of the core shroud, it is necessary to use the nitrogen gas for the shield gas protecting the melting portion and the vicinity thereof for preventing a weld defect. However, since the nitrogen is absorbed at a mass percent between 500 and 1000 ppm in the weld metal if the austenitic stainless steel is laser welded by using the nitrogen gas, a ferrite content of the weld metal becomes less than 5%, which is not preferable in the view of the stress corrosion crack resistance. Accordingly, it is preferable that at least a surface in a side contacting with a reactor water is provided with a portion which is filled with the weld metal having the ferrite content equal to or more than 5%.

In the weld joint portion, in order to inhibit the aged deterioration phenomenon from being generated such as the stress corrosion crack or the like, it is necessary that at least the weld metal in the side close contacting with the reactor water includes the ferrite having an area ratio or a volume ratio between 5% and 14% in an austenite structure.

In the laser welding in which the nitrogen gas is used as the shield gas, a predetermined ferrite content can be secured by using the austenitic stainless steel wire including 14% to 20% ferrite content calculated from the wire component for the welding wire. As a result, the ferrite content of the weld portion of the nuclear plan equipment constructing the austenitic stainless steel including the core shroud requires an amount between 5% and 14% in the view of a suppression of the stress corrosion crack resistance, however, since the ferrite content of the weld metal in the vicinity of the core surface can be secured at 5% or more, and it is possible to reduce the residual stress of the weld portion and reduce a region exposed to the plastic distortion in the vicinity of the weld portion and a working deformed amount, it is possible to inhibit the stress corrosion crack from being generated corresponding to the aged deterioration phenomenon in practical operation, thereby contributing to a long service life.

The filling welding in the vicinity of the surface mentioned above is achieved to the groove, however, in the weld portion of the core shroud, it is desirable in the view of the aged deterioration that the tensile residual stress is as small as possible, and the region exposed to the plastic distortion generated in the member in the vicinity of the weld metal by the solidification shrinkage of the weld metal is as small as possible. Preferably, it is desirable that the width of the portion exposed to the plastic distortion by the solidification shrinkage of the weld metal in the vicinity of the weld metal portion is equal to or less than 1 mm.

It is desirable that the filled built-up deposition weld portion is set to be at least equal to or more than 5% of the thickness while taking into consideration the inhibition of propagation of the crack in the case that the crack is generated in the surface. Further, taking into consideration the assembling work of the weld groove for the plural members, experience shows that it is desirable to make the length of the root face equal to or more than one quarter of the thickness. Accordingly, it is necessary to make the length of the root face equal to or more than 25% and equal to or less than 95% of the thickness.

Further, in the assembly of the large-scaled structure such as the core shroud, there is a case that it is necessary to correct a slight slope or the like at a time of assembling even for high machining accuracy, the correcting work becomes more easily carried out in the case that the root face of groove portion exists in the butted portion of the metal members. The groove shape mentioned above has the curvature in the end portion of the groove bottom portion, the width of the groove bottom portion constructed by the intersecting points of the extension line of both the side surfaces of the groove and the extension line of the groove bottom portion is between 1 mm and 4 mm, and the angle of the groove formed by both side surfaces of the groove is between 1 degree and 7 degree.

Embodiment 1

Figure 3:
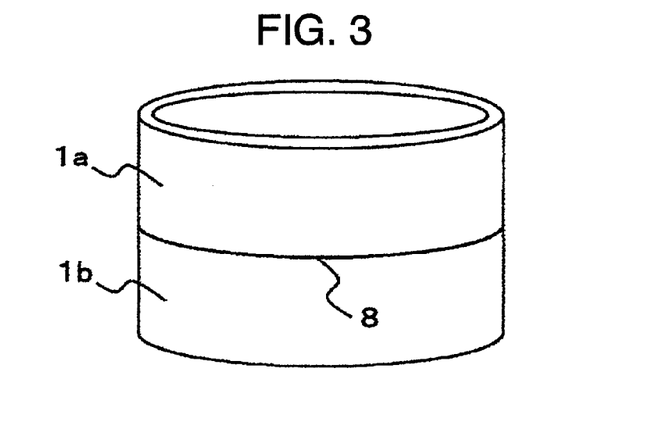
FIG. 3 is a schematic view of a cylindrical structure in accordance with an embodiment of the present invention.

FIG. 3 shows the shape of the weld structure in accordance with the present embodiment. The core shroud is manufactured by joining the cylindrical members 1, a shape of core shroud is shown in FIG. 1. Each of the members 1 is manufactured by a casting or a forging in one cylindrical member, or is manufactured by joining the members by welding. The thickness is different in correspondence to the material, the position or the like, however, the portion having the thickness between 40 and 60 mm is frequent. In the present embodiment, the cylindrical members 1a and 1b shown in FIG. 3 are buttjoint welded. The cylindrical members 1a and 1b are constructed by an austenitic stainless steel SUS316L material having a diameter about 6 m, and a thickness of 50 mm.

Figure 4:
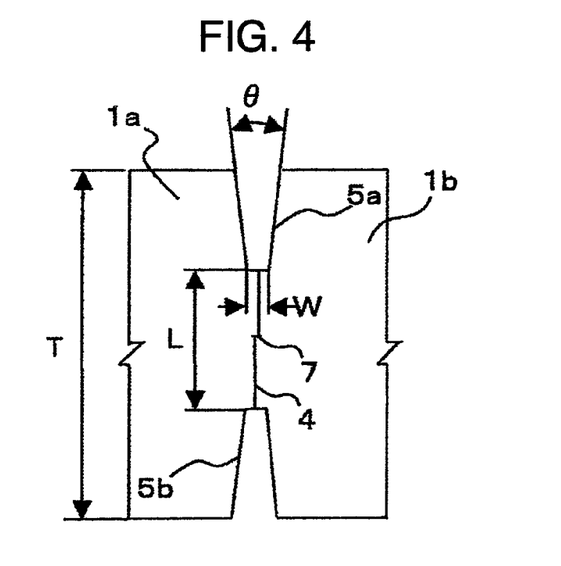
FIG. 4 is a cross sectional view of a weld groove in accordance with the embodiment of the present invention.

FIG. 4 shows a cross sectional shape of the weld groove formed in the butted portion 8. The weld groove is formed by butting the members 1a and 1b. The root face 4 in which the member surfaces are aligned with each other is formed in a center portion of the weld groove, and the groove channel portion 5 is formed in both sides thereof. A length L of the root face is set to 20 mm. This is a length in which the butted portions of the root faces can be completed molten by welding from both the sides by means of the laser power used in the present embodiment. The length L of the root face portion with respect to the thickness T is 40%.

Further, a step 7 called as a mating fit for accurately aligning both the members is formed in the root face 4. A step of the mating fit 7 is 0.5 mm. Since the step of the mating fit is set to such a height that an aligning work is easily carried out and the mating fit is completely molten by the laser welding, it is desirable to set the step of the mating fit or the depth of the concavity and convexity between 0.3 mm and 1.0 mm. Further, the mating fit is not limited to one position, but may be formed at a plurality of positions.

The step 7 called as the mating fit for accurately aligning both the members formed in the root face 4 is formed in the center portion in the length direction of the root face, in the present embodiment, however, this position is not limited, but may be formed above or below. In this case, it is necessary to completely weld the butted portion and the mating fit of the root face as mentioned above. On the other hand, since the penetration shape of the laser weld portion shows an inverse triangle shape, the penetration width becomes widest in the vicinity of the groove channel bottom portion. Accordingly, it is desirable that a position forming the mating fit is preferably at a position which is close to the groove channel bottom portion.

The other groove channel portions 5a and 5b than the root face 4 portion are constructed by a narrow groove in which a groove bottom width W is 3 mm, and a groove angle θ is 5 degree. The bottom width of the groove is a distance between the intersecting points of the extension line of both the side surfaces of the groove and the extension line of the groove bottom portion. In this case, the end portion of the groove bottom surface has a curvature. If the curvature of the end portion of the groove bottom surface is small, it does not have an effect of suppressing a generation of the weld defect such as a lack of fusion or the like which tends to be generated in the end portion of the bottom surface. Further, if the curvature is too large, it affects the penetration depth in the case of completely penetration welding the butted portions of the root faces 4 by the laser welding. Accordingly, it is desirable to set the curvature of the end portion of the groove bottom surface to a radius between about 0.3 mm and 1.0 mm.

In the case of the melt welding, in a base material portion called as a heat affected zone in the periphery of the weld metal, the member (the base material) is tensiled at a time of melting and solidification, and a plastic distortionis generated. The process strain is resided in the region exposed to the plastic distortion. Further, since the tensile residual stress is generated, it is desirable that the groove bottom width W of the groove channel portion 5 of the narrow groove formed by the members 1a and 1b is as narrow as possible in the light of the stress corrosion resistance.

However, if the groove bottom width is less than 1 mm, it affects a beam guide of the laser beam for melting the root face 4, and the penetration depth is reduced, so that it tends to be hard to completely melt the root face 4. On the contrary, if it goes beyond 4 mm, a lack of fusion tends to be generated in a groove wall surface at a time of deposition welding while adding the weld wire. Accordingly, the width W of the groove bottom is desirably set to 1 mm to 4 mm. Taking into consideration the beam guide within the groove of the laser beam, and the distortion of the groove portion going with the solidification shrinkage of the weld metal, it is desirable that the groove angle θ is between 1 degree and 7 degree.

In the manufacturing of the weld structure, since the weld groove assembling work affects a quality of the structure, it is very important. In the groove in accordance with the present embodiment, since the butted portion between the root faces has the thickness ratio which is equal to or more than 25%, and the mating fit for accurately aligning the members 1a and 1b is formed in the root face, the weld groove assembling work is easily carried out. Particularly, in the case that the weld groove is formed by lapping the member 1b over the member 1a, such as the present embodiment, it is possible to regulate the aligned position and correct the slope in a state in which the members are overlapped, if the root face portion is long. Accordingly, it is possible to simplify the installation of the assembling and constraining jigs and the stands, and it is possible to lighten the risk of causing damage such as a scratch or the like to the member.

Figure 5:
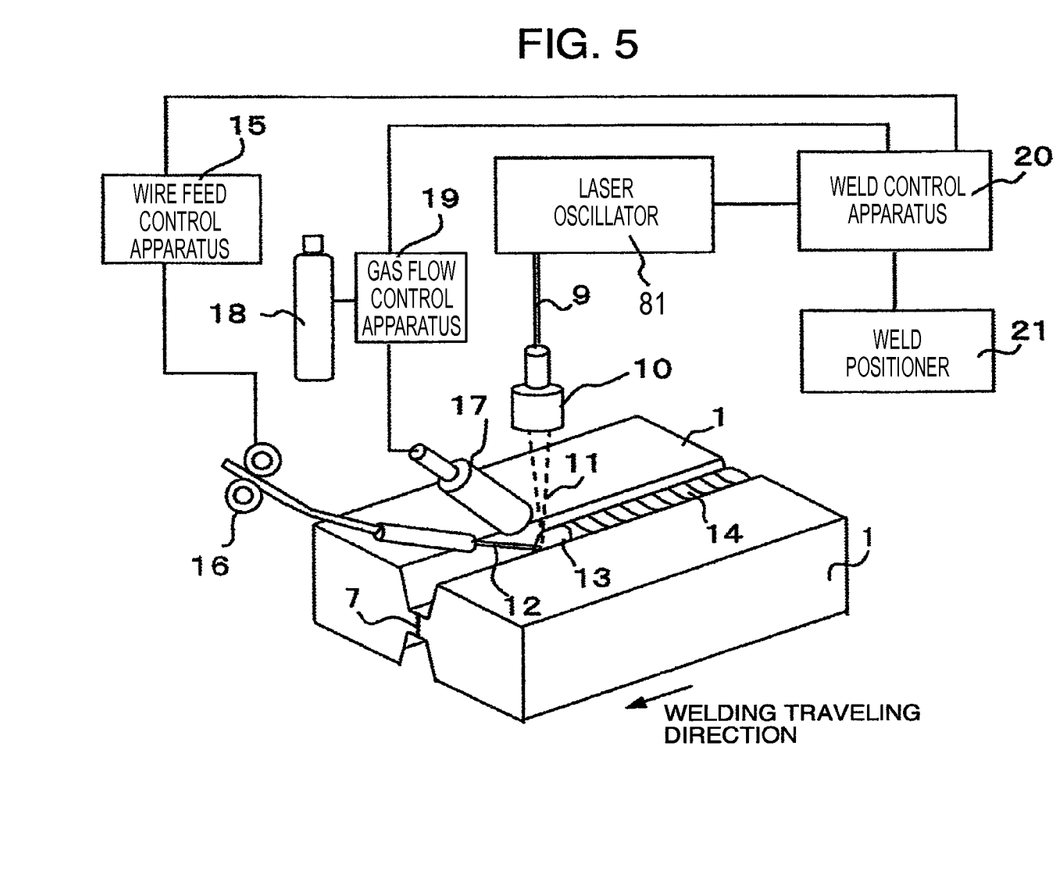
FIG. 5 is a schematic view of a welding apparatus in accordance with the embodiment of the present invention.

FIG. 5 shows a block diagram of a welding apparatus in accordance with the present embodiment. The laser beam oscillated from a laser oscillator 81 is transferred from an optical fiber 9 and is transmitted to a working head 10. A focused laser beam 11 focused by a lens in the working head 10 is irradiated into the groove formed by the members 1a and 1b, melts the member 1 and a weld wire 12, and carried out a welding while forming a molten pool 13, whereby a weld bead 14 is formed. The weld wire 12 is fed into the molten pool 13 from a forward side in a welding direction by a wire feeding apparatus 16 which is controlled by a wire feed control apparatus 15. The molten pool 13 and the vicinity thereof are shielded by a shield gas jetted from a shield gas nozzle 17. The shield gas is fed to the shield gas nozzle 17 from a gas cylinder 18 via a gas flow control apparatus 19. The laser oscillator, the wire feeding apparatus 16, the gas flow control apparatus 19 and a positioner 21 rotating the member 1 are connected to a weld control apparatus 20, and welding conditions such as a laser power, a welding speed, a wire feeding speed and the like and a motion timing are controlled and the welding is carried out.

The welded member having the shape in FIG. 3 is mounted on the weld positioner 21 which is not illustrated, is rotated and is structured such that a circumferential welding can be carried out. Further, the welding is carried out in a horizontal position and the groove in FIG. 4 is welded from both sides. In the block diagram of the welding apparatus in accordance with the present embodiment in FIG. 5, only one set of welding apparatus including the working head 10, the shield gas nozzle 17, the wire feeding apparatus 16 and the like is illustrated, however, an equipment having the same structure is installed to an opposite side, and the welding is carried out alternately from a front side direction and a backside direction by switching the laser beam output from the laser oscillator. Since the welded member of the present embodiment is the cylindrical material, the front side direction corresponds to an outer side and the backside direction corresponds to an inner side.

The laser oscillator employs a disc laser apparatus oscillating the laser beam having a wavelength 1030 nm. In the case the laser is constructed by a laser having a long oscillating wavelength such as a CO2 laser, the welding apparatus becomes large in size and a plasma tends to be generated, whereby a defect tends to be generated in the weld portion. Accordingly, it is preferable to employ a laser device in which a wavelength capable of transmitting the fiber is about 1 µm such as a YAG laser, a semiconductor laser, a fiber laser, a disc laser or the like which can be downsized its equipment and can easily obtain a high-quality weld portion, with respect to the welding of the nuclear plant equipment corresponding to the subject part of the present invention. Further, it is possible to add a heating means on the basis of a resistance heating or the like to the weld wire feeding apparatus 16 and employ an equipment for feeding the heated weld wire.

Figure 6:
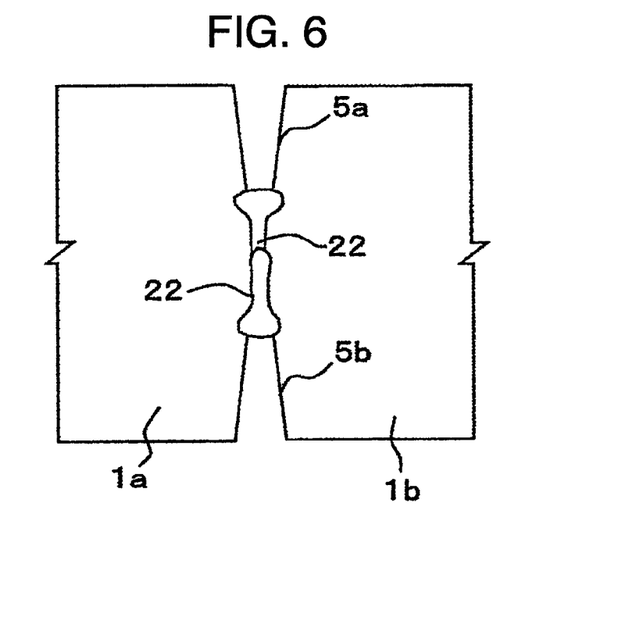
FIG. 6 is a cross sectional view of a weld joint portion after finishing the welding of a root face portion in accordance with the embodiment of the present invention.

The welding completely melts and bonds the butted portions of the members of the root faces by assembling the groove in the shape shown in FIG. 4, thereafter irradiating the laser beam 11 focused to the center of the bottom portion of the groove channel portion 5a from the outer side, forming a penetration 22 having an elongated shape as shown in FIG. 6, melting and bonding about 60% to 70% of the bonded surface of the root face 4, next forming the elongated shaped penetration 22 having the length which is 60% to 70% of the length L of the roof face in the root face portion in the same manner from an inner side in the opposite side, and lapping the penetration bead formed from the outer side over the penetration bead formed from the inner side near the center of the roof face. In this case, in the present embodiment, the root face portion is welded while feeding the weld wire, for improving the microstructure of the penetration portion, however, it is possible to weld only by the laser beam irradiation without feeding the weld wire. Further, in the embodiment in accordance with the present invention, the root face portion is welded from both the surfaces, however, may be completely molten and bonded by welding from one side.

Figure 7:
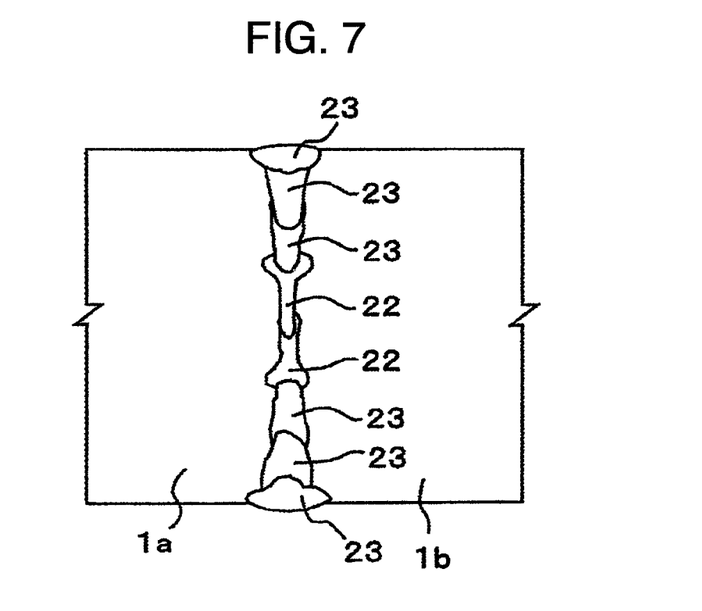
FIG. 7 is a cross sectional view of a weld joint portion after the welding in accordance with the embodiment of the present invention.

The member and the member are welded and bonded in accordance with a method of welding the root face portion, thereafter feeding the weld wire 12 into the narrow groove, and filling the groove by melting the wire by means of the laser beam. The welding of the groove channel portion is carried out by repeating the deposition of the deposited weld metal 23 which is formed by melting the weld wire and the member, and a weld portion shown in FIG. 7 is formed. This deposition may be achieved by carrying out the deposition welding of the outside groove channel portion and the inside groove channel portion alternately repeatedly, or by finishing the deposition of any one groove channel portion and thereafter carrying out the deposition welding of another groove channel portion. In view of the weld distortion, preferably, it is desirable to alternately carry out the inside deposition welding and the outside deposition welding. The welding of the weld joint in accordance with the present embodiment is carried out under a condition that the laser power is between 4 and 8 kw, and the welding speed is between 0.2 m/min and 0.5 m/min. Further, a position of a focal point of the laser beam is set to the bottom surface of the groove channel portion in the case of the welding of the root face, and is set to a position which is 3 mm to 30 mm above the deposited weld bead surface of the previous layer in the case of the deposition welding of the groove channel portion.

Both the welding of the roof face and the welding of the groove channel portion use the nitrogen gas as the shield gas protecting the molten portion and the vicinity thereof. It is possible to prevent gas pore called as porosity generated in the weld metal from being generated, by using the nitrogen gas which tends to be dissolved in the weld metal for the shield gas. The nitrogen content in the deposition welded metal portion formed by melting a lot of weld wire is between 500 and 1000 ppm.

On the other hand, nitrogen atomic element dissolved in the austenitic stainless steel operates as an austenite generating element. In the case of welding by using the weld wire which is used in the normal arc welding, a ferrite content in the weld metal is widely reduced, and it is impossible to secure a ferrite content 5% corresponding to a criteria of control which is necessary for suppressing stress corrosion crack of the nuclear plant equipment.

Figure 8:
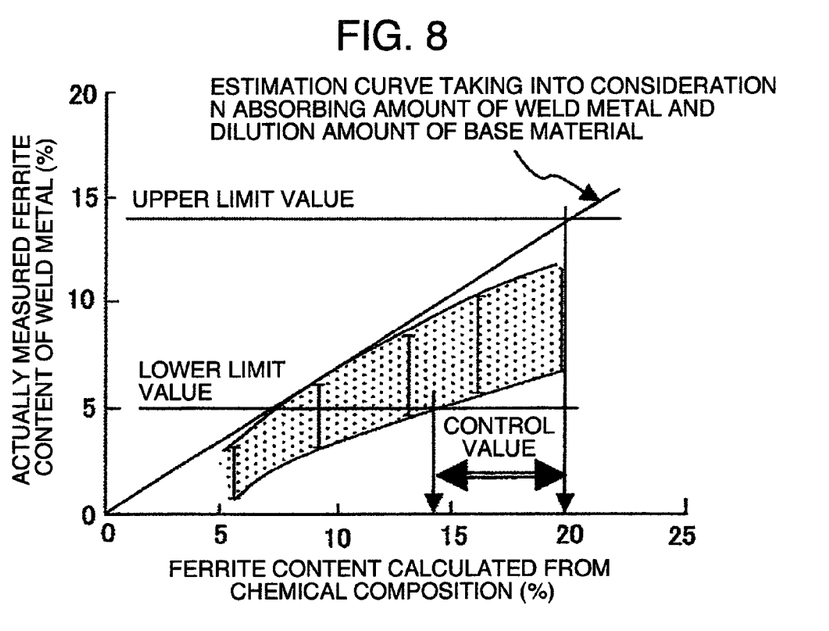
FIG. 8 is a relationship view between a value calculated from a chemical composition and an actually measured ferrite content of the weld metal.

FIG. 8 shows a relationship view between a ferrite content of the weld metal calculated from a chemical component and a nitrogen content in the weld metal formed by carrying out the deposition welding of the groove channel portion by using the nitrogen gas for the shield gas. The ferrite content from the chemical composition is calculated on the basis of the following formula.

$$\text{Ferrite content}(\%)=-30.65+3.49(Cr+Mo+1.5Si)-2.5[Ni+30(C+N)+0.5Mn]$$

The actually measured ferrite contentin the weld metal portion is smaller than an estimation curve which is calculated by taking into consideration a dilution of the member molten at a time of welding and an nitrogen content estimated to be included in the weld metal portion. It is thought that this is caused by a comparatively high cooling speed of the weld metal in the laser weld portion. In order to secure the ferrite content equal to or more than 5% in the weld metal portion, it is necessary to use the weld wire in which the ferrite content calculated from the chemical component is equal to or more than 14%. Further, since the weld crack tends to be generated if the ferrite content is too high, an upper limit of the ferrite content in the weld metal roughly targets at 14%. Since the actually measured value is lower than the estimation curve, an upper limit of the ferrite content of the weld wire composition comes to 20% if a value obtained from the estimation curve is set to the upper limit value.

Accordingly, as the weld wire in the case of welding the austenitic stainless steel by using the nitrogen gas as the shield gas, it is necessary to use the weld wire of a composition having a range that the ferrite content calculated from the material component is between 14% and 20%.

Table 1 shows a composition of the used and the weld wire which are used in the embodiment in accordance with the present invention. A calculated value of the ferrite content of the weld wire is 17.7%. The ferrite content of the weld metal in the groove channel portion welded by using the wire having the present composition is between 7% and 12%. In this case, the ferrite content of the weld portion is calculated on the basis of the cross sectional structure of the weld joint portion.

TABLE 1

| Mate- | Chemical Composition (wt %) | | | | | | | | |
|---|---|---|---|---|---|---|---|---|---|
| rial | C | Si | Mn | P | S | Ni | Cr | Mo | N |
| Member | 0.011 | 0.48 | 0.87 | 0.023 | 0.005 | 12.37 | 17.48 | 2.24 | 0.02 |
| Weld Wire | 0.015 | 0.41 | 1.58 | 0.018 | 0.003 | 9.39 | 21.35 | 0.03 | 0.025 |

There is a case that the composition of the weld wire of the austenitic stainless steel is controlled on the basis of a ratio between a Cr equivalent and an Ni equivalent which is calculated from the composition, however, it is desirable that the range of Cr equivalent/Ni equivalent from which the ferrite content 14% to 20% calculated from the material composition is set to a composition of a ranged between 1.9 and 2.2 in the case of calculating the Cr equivalent and the Ni equivalent in accordance with the following expression.

Cr equivalent: Cr+1.37×Mo+1.5×Si+2×Nb+3×Ti

Ni equivalent: Ni+0.31×Mn+22×C+14.2×N+Cu

In this connection, Cr equivalent/Ni equivalent of the weld wire in Table 1 is 2.08.

Figure 9:
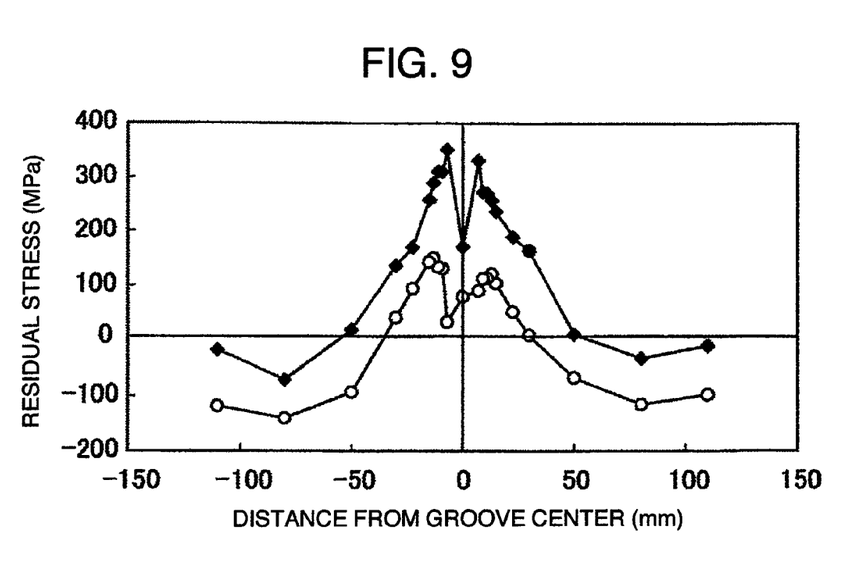
FIG. 9 shows a result of measurement of a residual stress of a welding joint portion in accordance with the embodiment of the present invention.

FIG. 9 shows a result of residual stress measurement of the weld joint surface of the member after the welding procedure in accordance with the embodiment of the present invention. The residual stress is measured by using an X-ray residual stress measuring apparatus. A mark ● indicates a result of measurement of the residual stress of the weld joint portion which is welded in accordance with the prior art by using the groove in FIG. 2, for a comparative purpose, and a mark ○ indicates a result of measurement of the residual stress of the weld joint manufactured in accordance with the manufacturing method of the present invention. The maximum residual stress of the weld joint executed by using the manufacturing method in accordance with the present invention is about 170 MPa, and is about one half in comparison with the prior art (360 MPa), and the residual stress of the weld portion is widely reduced.

Further, a plastic distortion region generated by the solidification shrinkage of the weld metal is generated in the member in the vicinity of the weld portion, however, as a result of measuring the thickness and the shrinkage amount in an orthogonal direction of the weld groove portion which come to an index of large and small of the plastic distortion region width, the shrinkage amount of the embodiment in accordance with the present invention is about 1 mm, and is widely smaller than the shrinkage amount about 6 mm in the prior art preformed in the groove in FIG. 2, and the plastically deformed region in the periphery of the weld metal is widely narrowed.

As mentioned above, the weld metal can obtain the austenite microstructure including 5% or more ferrite by using the manufacturing method in accordance with the present invention, and the plastically deformed region by the solidification shrinkage is narrow, and it is possible to obtain the weld microstructure having the weld joint in which the compression residual stress is lowered.

Figure 10:
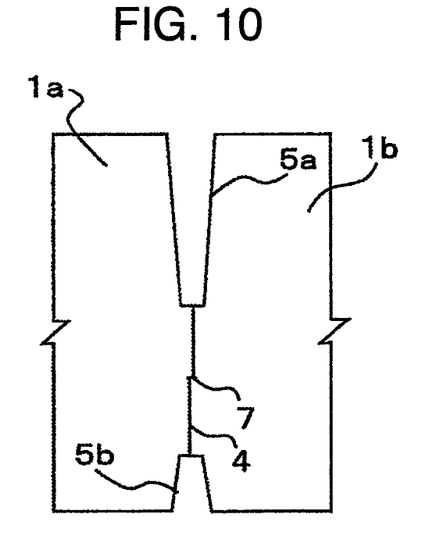
FIG. 10 is a cross sectional view of a weld groove having the other shape in accordance with the embodiment of the present invention.
Figure 11:
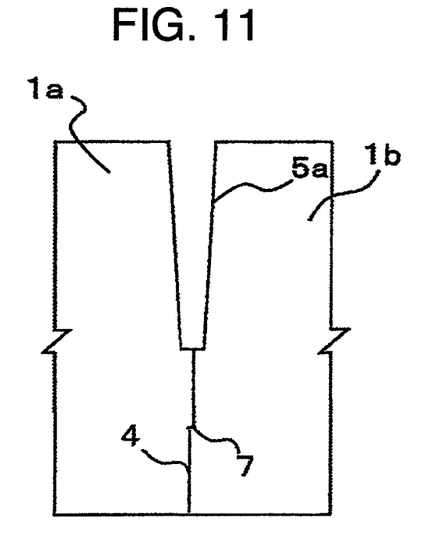
FIG. 11 is a cross sectional view of a weld groove having the other shape in accordance with the embodiment of the present invention.

In the embodiment in accordance with the present invention, the root face portion of the weld groove is formed in the center portion of the thickness, however, may be formed by being shifted to the front side or the back side, as shown in FIG. 10. Further, it may be formed by being welded from any one of the front side and the face side of the groove as shown in FIG. 11. In this case, it is preferable to set the groove channel portion to the side coming into contact with the cooling water. Further, in the embodiment in accordance with the present invention, the description is given of the result in the case of being applied to the circumference welding of the cylindrical material, however, the manufacturing method in accordance with the present invention is not limited to this.

In the present embodiment, the description is given of the application example in the manufacturing of the shroud of the nuclear plant, however, the manufacturing method in accordance with the present invention can be applied to general nuclear plant structures using the austenitic stainless steel.

Industrial Applicability

In accordance with the present invention, it is possible to manufacture the high-quality core shroud in which the generation of the stress corrosion crack due to the damage of the core surface and the residual stress of the weld joint portion is suppressed, as well as achieving the reduction of the welding working labor of the core shroud for the nuclear power plant. Further, the present invention is preferably applied to the nuclear power plant structure in which the constructing parts are constructed by the austenitic stainless steel.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method of manufacturing a core shroud for a nuclear power plant, the method comprising steps of:
setting a narrow groove between abutting surfaces of first and second metal members adjacent to each other, each of the first and second metal members having a respective thickness not less than 30 mm, with a root face on each of the abutting surfaces, each root face having its length which is between 25% and 95% of a thickness of a thinner one of the first and second metal members; and
laser welding the abutting surfaces with a welding wire to construct the core shroud, the laser welding being performed in a shielding gas including nitrogen,
wherein the welding wire comprises an austenitic stainless steel including a ferrite content of 14-20% calculated from the material composition of the welding wire, and a ratio between Cr in the austenitic stainless steel and Ni in the austenitic stainless steel is 1.9-2.2.

2. The method of manufacturing a core shroud for a nuclear power plant in claim 1, wherein:
a curved surface is provided in an end portion of a groove bottom portion of said narrow groove, and a width of the groove bottom portion constructed by intersecting points of an extension line of a side surface in both sides of said narrow groove and an extension line of the groove bottom portion is set to 1 mm to 4 mm, and
an angle of the groove formed by the side surfaces in both sides of said groove is between 1 degree and 7 degrees.

3. The method of manufacturing a core shroud for a nuclear power plant in claim 1, wherein:
a step is formed between the abutting surfaces of the first and second members, or
a concavity is formed in one of the metal members and a convexity is formed in the other metal member.

4. The method of manufacturing a core shroud for a nuclear power plant as claimed in claim 1, further comprising the steps of:
forming a weld groove by butting the root faces;
complete penetration welding the root faces from one side or both sides; and
deposition welding said narrow groove portion while adding the welding wire.

* * * * *